March 5, 1929.  J. R. CAUTLEY  1,704,033

BRAKE DRUM

Original Filed March 11, 1924

INVENTOR
JOHN R. CAUTLEY
BY
M. W. McConkey
ATTORNEY

Patented Mar. 5, 1929.

1,704,033

UNITED STATES PATENT OFFICE.

JOHN R. CAUTLEY, OF SOUTH BEND, INDIANA, ASSIGNOR TO BENDIX BRAKE COMPANY, OF CHICAGO, ILLINOIS, A CORPORATION OF ILLINOIS.

BRAKE DRUM.

Original application filed March 11, 1924, Serial No. 698,463. Divided and this application filed July 6, 1925. Serial No. 41,550.

This invention relates to brake drums, and one object is to provide a strong and efficient drum which may, if desired, be pressed out of relatively light metal. In one desirable arrangement, the cylindrical breaking flange is reinforced against distortion by a separate member, shown as a hoop, which encircles it, and which is preferably formed with flanges serving as heat-radiating ribs.

Figure 1:
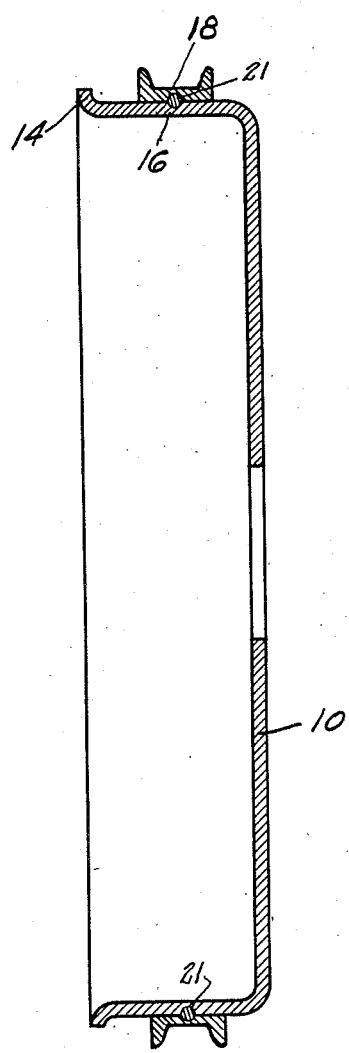
Figure 2:
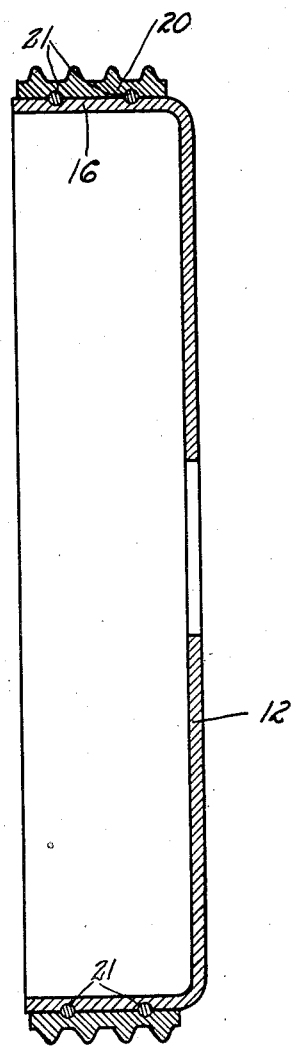

The above and other objects and features of the invention will be apparent from the following description of two illustrative embodiments shown in the accompanying drawings, in which:

Figs. 1 and 2 are diametrical sections through two brake drums, each of which embodies one modification of my invention.

In each arrangement, the drum 10 (Fig. 1) and 12 (Fig. 2) is pressed from relatively light sheet metal. The drum 10 is pressed to form an edge flange 14, which somewhat reinforces it and which serves to some extent as a heat-radiating rib or fin. This flange is also easily machined coaxially of the drum to form a close joint, almost watertight, with an encircling flange on a backing plate. Each drum has a cylindrical backing flange 16.

Ordinarily a drum of this character is too weak, being easily distorted outwardly by the brake shoes. To prevent this, I provide each drum with a hoop 18 or 20 or an equivalent encircling reinforcing member, which may be heated to slip over the flange 16 of the drum, and then allowed to shrink onto the flange, where it may be spot-welded or otherwise secured as indicated at 21. Member 18 is channel-shaped in cross-section, and member 20 is in the form of a plurality of channels, in either case providing a plurality of outwardly projecting flanges serving as heat-radiating ribs or fins and also serving additionally to reinforce the drum.

While two illustrative embodiments of the invention have been described in detail, it is not my intention to limit its scope to those particular embodiments, or otherwise than by the terms of the appended claims. The present application is a division of my application No. 698,463, filed March 11, 1924.

I claim:

1. A brake drum generally cup-shaped in form and having a substantially cylindrical braking flange, and a separate part channel-shaped in cross-section encircling, carried by and fused to said flange and reinforcing it against distortion and arranged with outwardly projecting flanges serving as heat-radiating ribs.

2. A brake drum having a substantially cylindrical braking flange and a separate hoop encircling and carried by said flange and reinforcing it against distortion, the hoop being of such diameter as to be forced over the flange after the drum is formed and being a close fit over said flange to be in intimate compressed engagement therewith throughout.

3. A pressed metal brake drum generally cup-shaped and having a substantially cylindrical braking flange, and a cylindrical separate hoop encircling and carried by said flange and fused thereto and reinforcing it against distortion and formed with a plurality of parallel outwardly projecting flanges serving as heat-radiating ribs and additionally reinforcing said flange.

4. A pressed metal brake drum generally cup-shaped and having a substantially cylindrical braking flange, and a separate reinforcing annulus shrunk over said flange and fused thereto.

In testimony whereof I have hereunto signed my name.

JOHN R. CAUTLEY.